Patented Sept. 10, 1940

2,214,140

UNITED STATES PATENT OFFICE 2,214,140

MOLDED ARTICLE AND METHOD OF PRODUCING SAME

Charles Harry Luby, Philadelphia, Pa., assignor to Corn Products Refining Company, New York, N. Y., a corporation of New Jersey No Drawing. Application December 16, 1936, Serial No. 116,117

17 Claims. (Cl. 18—48)

This invention is directed to the production of molded articles from vegetable proteins, such as zein, gliadin, hordin, and the like, and to the molded articles so produced.

It has heretofore been known to produce various types of molded articles and thermoplastic materials from vegetable proteins, but those procedures heretofore known have involved the use of expensive plasticizing materials and/or the use of expensive apparatus for hot molding. Moreover, it has hitherto been considered necessary in all cases to treat the vegetable protein with various re-agents in order to modify it and make it suitable for use in the production of molded articles by such prior art procedures.

For example, it has been proposed to treat various vegetable proteins with alkali compounds to produce complex alkali salts of the proteins and then mold the resultant product under heat and pressure, a hardening agent being either present during the molding operation or reacted with the molded product after the molding operation. It has also been proposed to form insoluble salts with inorganic bases of the vegetable protein, admixed with insoluble soaps, and press and harden such material. It has further been proposed to make a molding powder that may be molded in the usual ways by the use of heat and pressure by admixing vegetable proteins with non-reactive plasticizing materials which will form with the vegetable protein a homogeneous thermoplastic mass.

In accordance with this invention a substantially pure, unmodified alcohol-soluble vegetable protein, such as, for example, zein, gliadin, hordin, and the like, is compressed in the cold, without the addition of any plasticizing or other modifying agents, to form a compacted mass of granular material having the desired shape of the article to be produced, and this compacted mass is subsequently treated by a hardening agent, as, for example, an aqueous solution of formaldehyde, with the result that the surface layer only of the article is transformed into a homogeneous, hard, tough, and resistant shell of colloided, hardened protein.

In accordance with this invention the alcohol-soluble vegetable protein, preferably zein, is treated by known methods to substantially free it of its fat content, if it is not already obtained in the fat-free form in which it is commercially available, and the substantially fat-free protein is then ground to a rather fine powder, for example, having a fineness of from about 40 to about 100 mesh. The ground zein, or other vegetable protein, may be admixed, if desired, with pigments or dyes in order to produce any desired color effect in the finished article. Small amounts of fillers may also be incorporated with the ground powder, but care must be taken that the quantity of added filler is not sufficiently large to interfere with the proper cohesion of the ground powder after it has been compressed as hereinafter described. Non-reactive plasticizing agents may be added to the ground powder in relatively minute quantity, inasmuch as they will, to some extent, assist in the formation of the compacted powder in the compression step. It is essential, however, in accordance with this invention, that the amount of plasticizer used, if any is used, be so small that the granular or powdery character of the ground protein will not be destroyed in the compression step.

It will be noted that the protein used, as, for example, zein, in accordance with this invention is chemically unmodified, and is accordingly substantially pure alcohol-soluble vegetable protein rather than the complex alkali salts of the vegetable proteins hitherto used in the production of molded articles.

The finely ground protein and added ingredients, if any, are then compressed in the cold, i. e., without the use of heat to soften the protein or render it plastic, for example at a temperature not substantially in excess of 100° F., preferably at a temperature of about 70° F., into any desired shape, which shape will be that of the final molded article to be produced. Thus, for example, the ground powder may be compressed into the form of buttons, buckles, and the like, or indeed, any of the various shapes in which molded articles are formed by the conventional hot molding processes. This compression may be carried out in any mechanical press, using either hydraulic or mechanical pressure, at pressures up to twelve tons per square inch. The usual tableting machines employed in the production of tablets of medicinal remedies and the like may be employed for this purpose without any adaptation other than the changes in the dies employed and in the working pressures used.

The compressed vegetable protein, as, for example, zein, will, of course, be chemically identical with the ground powder supplied to the press, and will differ physically from this ground powder only in being compacted. It is non-homogeneous, non-transparent, granular, and while possessing sufficient strength to resist breakage by ordinary handling, etc., does not possess any great degree of strength, and may be broken between the fingers. It possesses a high degree of adsorbency, and may be used to advantage without further treatment in filtering apparatus, gas masks and the like when an adsorbent material is desired.

This compacted mass of vegetable protein is then transformed in accordance with this invention into the final hard, rigid, water-resistant and lustrous product by treatment with a hardening agent which will toughen, harden and colloid the surface thereof. Preferably, this hardening agent is formaldehyde, which may be used in a form of gas, or more conveniently as a 10 to 40% aqueous solution. The hardening is accomplished by subjecting the compacted articles to an atmosphere of formaldehyde gas in a closed vessel, or by immersing them in an aqueous solution of formaldehyde.

It will be found that it is most convenient to immerse the compacted articles in an aqueous formaldehyde solution. This may conveniently be done by placing the compacted articles in suitable trays or racks arranged so as to present substantially the entire surface of the articles to the action of the solution, and immersing the trays and racks containing the compacted articles in a vessel containing, for example, a 40% aqueous solution of formaldehyde, which may be kept in circulation by means of a pump or agitator to insure uniformity of the solution. It is important to make sure that the several compacted articles immersed in the bath do not contact each other, since under such circumstances the contacting articles will be bonded together at their point of contact by the action of the formaldehyde solution. Of course, under some circumstances it may be desirable to so unite two or more compacted articles, and in this case they may be placed together in desired position and then subjected to the action of the formaldehyde solution.

The temperature of the aqueous formaldehyde bath may range from about 60° to about 100° F., but will preferably be maintained at approximately 70° F. At this temperature the articles should be allowed to remain in the hardening bath for not less than six hours, and may be permitted to remain for a much longer time. The action of the formaldehyde solution, or of the formaldehyde gas, is to colloid or gelatinize, and toughen and harden the surface layer of the compacted article. This action of the formaldehyde solution proceeds from the exterior of the article toward the interior, and will progress in the first six hours of immersion in formaldehyde solution to a depth of approximately $\frac{1}{16}$ of an inch. The colloiding and hardening action progresses more and more slowly after the six-hour period until after an immersion of about one week it may have progressed to a depth of approximately ⅛ of an inch. Further immersion has apparently no further hardening action on the article, and the interior of the article, unless, of course, it is very thin, will retain the physical appearance and properties of the original compacted untreated article. That is to say, it will be non-homogeneous, in fact, distinctly granular and opaque. The hardened, colloided outer shell of the article will, on the other hand, be translucent (if no pigments have been incorporated in the molded article), homogeneous, extremely tough, relatively hard, and highly resistant to the action of moisture. Since substantially no shrinkage occurs during the hardening step, the final molded article will have substantially the size, and exactly the shape, of the compacted, untreated article from which it was produced.

In order to whiten the finished article and give it an opaque white, or ivory color, there my be incorporated in the aqueous formaldehyde solution in which it is hardened, a saturated solution of lead acetate or barium chloride, and the hardened article, after withdrawal from this solution, may be immersed for approximately two hours in a 10% aqueous solution of hydrochloric acid, if lead acetate was used, or a saturated aqueous solution of sodium sulphate, if barium chloride was used. The precipitated insoluble salt gives a good white color to the article, being incorporated in the article throughout the colloided and hardened outer layer.

After removal of the finished article from the formaldehyde bath and from the whitening bath, if such has been employed, the articles are dried at a relatively low temperature, polished by tumbling, buffing, or other polishing operation, and if no pigment or dye has been incorporated into the ground protein from which they were produced, they may then be dyed by immersion in a solution of a water or alcohol-soluble aniline dye, or in a solution of one of the vegetable dyes.

From the foregoing description it will be appreciated that the process in accordance with my invention comprises essentially the compression, without the aid of heat, of a substantially pure, unmodified alcohol-soluble vegetable protein, as, for example, zein, gliadin, hordin, etc., to form a compacted granular mass physically identical, except for being compacted, with the original ground protein, and subjecting this compacted mass, having the shape of the article desired to be produced, to the action of a hardening agent, as, for example, formaldehyde, to colloid or gelatinize and so toughen and harden the outer surface of the compacted article to a depth of approximately $\frac{1}{16}$ of an inch, without changing the physical characteristics of the inner parts of the article. The product in accordance with this invention will be characterized and distinguished from all prior art products by possession of a distinct and definite outer layer approximately $\frac{1}{16}$ of an inch in thickness of homogenized and colloided or gelatinized protein-hardening agent reaction product, which is, in the absence of included opaque pigments, etc., translucent, and is relatively hard, tough and water-resistant; and an interior that consists of compacted, granular, unmodified, substantially pure vegetable protein. These two distinct portions of the molded article in accordance with this invention may easily be seen and recognized by slicing or breaking the molded article so as to expose a cross-section therethrough.

It will be understood that the details and examples hereinbefore set forth have been set out by way of illustration only, and are not intended to limit in any way the scope of the invention herein described and claimed. The zein specified as preferred will ordinarily contain only a small quantity of fat such for example as is contained in ordinary commercially available zein, and the term "substantially fat free" does not preclude a small residual fat content such as this. Commercial zein contains ordinarily about 7–15% moisture depending on atmospheric condition, more commonly about 10–12%. The term "plasticizing materials" or its equivalent as used herein means substances employed for softening the protein material and making it plastic and dough-like, thereby destroying its granular character which the present invention preserves throughout this process except as the surface layers or regions of the articles will ultimately be made homogeneous, i. e., non-granular by the action of the formaldehyde.

The articles produced in accordance with this invention, though sufficiently strong, are, because of the granular character of their center portions, lighter and less dense than articles formed of material made plastic, for example, by plasticizers and heat. Being less dense an economy of protein material results besides the saving in the cost of the plasticizing substances employed by other processes. The articles are also cheap to make because the pressing is in the cold and may be done rapidly by automatic machinery such as tableting machines in common use. The material retains its granular character throughout the process, until the surface layer is gelatinized, so that the material may be fed to the compressing machinery as a free running material and when compressed will still be in a dry, non-plastic state so as to be easily and quickly removed from the molds. Because of the granular character of the material, even when compressed to the extent necessary to give it the requisite cohesiveness for subsequent handling of the formed article without breaking, the bodies will be readily permeated by the formaldehyde solution, at least through enough of the surface later to give necessary strength to the articles.

This application is filed as, and constitutes, a continuation-in-part of my co-pending application Serial No. 51,972, filed November 27, 1935.

What I claim and desire to protect by Letters Patent is:

1. The method of producing molded articles which comprises compressing a finely ground, substantially fat-free alcohol-soluble vegetable protein, free from any substantial quantity of plasticizing or modifying agent, at a temperature below that which will soften the protein to form a compacted mass of granular nature having the shape of the molded article to be formed, and subjecting the compacted mass to the action of a hardening agent so as to gelatinize and harden at least the surface layer thereof.

2. The method of producing molded articles which comprises compressing a finely ground, substantially fat-free alcohol-soluble vegetable protein, free from any substantial quantity of plasticizing or modifying agent, at a temperature below that which will soften the protein to form a compacted mass of granular nature having the shape of the molded article to be formed, and subjecting the compacted mass to the action of formaldehyde so as to gelatinize and harden at least the surface layer thereof.

3. The method of producing molded articles which comprises compressing a finely ground, substantially fat-free alcohol-soluble vegetable protein, free from any substantial quantity of plasticizing or modifying agent, at a temperature below that which will soften the protein to form a compacted mass of granular nature having the shape of the molded article to be formed, and subjecting the compacted mass to the action of a 10-40% aqueous solution of formaldehyde so as to gelatinize and harden at least the surface layer thereof.

4. The method of producing molded articles which comprises compressing finely ground, substantially fat-free zein, free from any substantial quantity of plasticizing or modifying agent, at a temperature below that which will soften the zein to form a compacted mass of granular nature having the shape of the molded article to be formed, and subjecting the compacted mass to the action of a hardening agent so as to gelatinize and harden at least the surface layer thereof.

5. The method of producing molded articles which comprises compressing finely ground, substantially fat-free zein, free from any substantial quantity of plasticizing or modifying agent, at a temperature below that which will soften the zein to form a compacted mass of granular nature having the shape of the molded article to be formed, and subjecting the compacted mass to the action of formaldehyde so as to gelatinize and harden at least the surface layer thereof.

6. The method of producing molded articles which comprises compressing finely ground, substantially fat-free zein, free from any substantial quantity of plasticizing or modifying agent, at a temperature below that which will soften the zein to form a compacted mass of granular nature having the shape of the molded article to be formed, and subjecting the compacted mass to the action of a 10-40% aqueous solution of formaldehyde so as to gelatinize and harden at least the surface layer thereof.

7. The method of producing molded articles which comprises compressing finely ground, substantially fat-free zein, free from any substantial quantity of plasticizing or modifying agent, at a temperature below that which will soften the zein to form a compacted mass of granular nature having the shape of the molded article to be formed, immersing the compacted mass in a 10-40% solution of formaldehyde for not less than six hours so as to gelatinize and harden at least the surface layer thereof, and drying and polishing the molded article after its removal from the formaldehyde bath.

8. The method of producing molded articles which comprises compressing finely ground, substantially fat-free zein, free from any substantial quantity of plasticizing or modifying agent, at a temperature below that which will soften the zein to a form a compacted mass of granular nature having the shape of the molded article to be formed, immersing the compacted mass in a 10-40% aqueous solution of formaldehyde containing an inorganic salt capable of reaction with a second inorganic material to form an insoluble precipitate for not less than six hours to harden the surface layer thereof, then immersing the hardened article in a solution of said second inorganic material, and finally drying the said article.

9. The method of producing molded articles which comprises compressing finely ground, substantially fat-free zein, free from any substantial quantity of plasticizing or modifying agent, at a temperature below that which will soften the zein to form a compacted mass of granular nature having the shape of the molded article to be formed, immersing the compacted mass in a 10-40% aqueous solution of formaldehyde containing barium chloride for not less than six hours to harden the surface layer thereof, then immersing the hardened article in a solution of a soluble sulfate, and finally drying the said article.

10. The method of producing molded articles which comprises compressing a mixture of finely ground, substantially fat-free zein and a pigment at a temperature below that which will soften the zein to form a compacted mass of granular nature having the shape of the molded article to be formed, and subjecting the compacted mass to the action of a hardening agent so as to gelatinize and harden at least the surface layer thereof.

11. The method of producing molded articles which comprises compressing finely ground, substantially fat-free zein, free from any substantial quantity of plasticizing or modifying agent, at a temperature below that which will soften the zein to form a compacted mass of granular nature having the shape of the molded article to be formed, subjecting the compacted mass to the action of a hardening agent so as to gelatinize and harden at least the surface layer thereof, and dyeing the hardened article.

12. A molded article formed from an alcohol-soluble vegetable protein characterized by possessing a homogeneous, gelatinized, tough, hard surface layer comprising a vegetable protein-hardening agent condensation product and an interior of compacted, granular, substantially unaltered vegetable protein.

13. A molded article formed from an alcohol-soluble vegetable protein characterized by possessing a homogeneous, gelatinized, tough, hard surface layer comprising a vegetable protein-formaldehyde condensation product and an interior of compacted, granular, substantially unaltered vegetable protein.

14. A molded article formed from zein characterized by possessing a homogeneous, gelatinized, tough, hard surface layer comprising a zein-formaldehyde condensation product and an interior of compacted, granular, substantially unaltered zein.

15. A molded article formed from zein characterized by possessing a homogeneous, gelatinized, tough, hard surface layer approximately $\frac{1}{16}$ inch in depth comprising a zein-formaldehyde condensation product and an interior of compacted, granular, substantially unaltered zein.

16. Process of producing molded articles which comprises pressing zein in a granular non-plastic state at a temperature to form bodies of substantially the size and shape of the molded articles to be produced, in which bodies the zein retains its granular character but is compacted and made coherent whereby said bodies may be handled without deformation or breakage in the later stages of the process; and subjecting the bodies thus formed to the action of formaldehyde to gelatinize and harden the surface regions of said bodies.

17. Process of producing molded articles which comprises cold pressing zein in a granular non-plastic state to form bodies of substantially the size and shape of the molded articles to be produced, in which bodies the zein retains its granular character but is compacted and made coherent whereby said bodies may be handled without deformation or breakage in the later stages of the process; and subjecting the bodies thus formed to the action of a water solution of formaldehyde to gelatinize and harden the surface regions of said bodies.

CHARLES HARRY LUBY.